US012699626B2

(12) United States Patent
Magni et al.

(10) Patent No.: US 12,699,626 B2
(45) Date of Patent: Aug. 4, 2026

(54) MONITORING FEC INFORMATION IN MULTI-CHIP ENVIRONMENT

(71) Applicant: Marvell Asia Pte Ltd, Singapore (SG)

(72) Inventors: Federico Magni, Pavia (IT); Paolo Pascale, Rho (IT); Michael Duckering, Kanata (CA); Volodymyr Shvydun, Union City, CA (US); Michael Wyzga, Kanata (CA); Trevor Poon, Nepean (CA); Nicola Carta, Pavia (IT); Claus Christensen, Kanata (CA); Michael Lewis Takefman, Nepean (CA)

(73) Assignee: Marvell Asia Pte Ltd, Singapore (SG)

( * ) Notice: Subject to any disclaimer, the term of this patent is extended or adjusted under 35 U.S.C. 154(b) by 84 days.

(21) Appl. No.: 18/948,254

(22) Filed: Nov. 14, 2024

(65) Prior Publication Data

US 2025/0156270 A1 May 15, 2025

Related U.S. Application Data

(60) Provisional application No. 63/548,540, filed on Nov. 14, 2023.

(51) Int. Cl.
*G06F 11/10* (2006.01)
(52) U.S. Cl.
CPC ............................... *G06F 11/1044* (2013.01)
(58) Field of Classification Search
CPC .... G06F 11/1044; H04L 1/0045; H04L 1/203; H04L 25/14; H04L 1/0071
See application file for complete search history.

(56) References Cited

U.S. PATENT DOCUMENTS

| | | | |
|---|---|---|---|
| 9,998,146 B2 | 6/2018 | Szczepanek et al. | |
| 11,265,025 B2 | 3/2022 | Shvydun | |
| 11,764,811 B2 | 9/2023 | Smith et al. | |
| (Continued) | | | |

FOREIGN PATENT DOCUMENTS

EP      2461623 B1      2/2020

OTHER PUBLICATIONS

Azadet et al., "Forward Error Correction (FEC) techniques for optical communications," IEEE 802.3 High-Speed Study Group Plenary Meeting, Montreal, Jul. 1999 (31 pages).
(Continued)

*Primary Examiner* — Thien Nguyen

(57) ABSTRACT

A first integrated circuit (IC) chip of a communication device includes a first communication interface that receives a first portion of an input data signal, a first forward error correction (FEC) decoder circuit that generates first error information regarding the first codeword symbols in the first portion of the input data signal, a second communication interface, and a first statistics generator circuit that generates error statistics information using a) the first error information and b) second error information received via the second communication interface. A second IC chip includes a third communication interface that receives a second portion of the input data signal, a second FEC decoder circuit that generates the second error information, the second error information regarding second codeword symbols in the second portion of the input data signal, and iii) a fourth communication interface that sends the second error information to the second communication interface.

23 Claims, 8 Drawing Sheets

(56) References Cited

U.S. PATENT DOCUMENTS

| 2010/0281343 | A1* | 11/2010 | Caggioni | H04Q 11/0062 |
| | | | | 714/776 |
| 2018/0123613 | A1* | 5/2018 | Szczepanek | H03M 13/1515 |
| 2022/0201225 | A1 | 6/2022 | Riani et al. | |
| 2025/0004211 | A1 | 1/2025 | Takefman et al. | |

OTHER PUBLICATIONS

International Search Report and Written Opinion for PCT Application No. PCT/US2024/056015, mailed Feb. 13, 2025 (9 pages).
Tychopoulos et al., "FEC in Optical Communications," IEEE Circuits & Devices Magazine, Nov./Dec. 2006 (8 pages).

* cited by examiner

*FIG. 8*

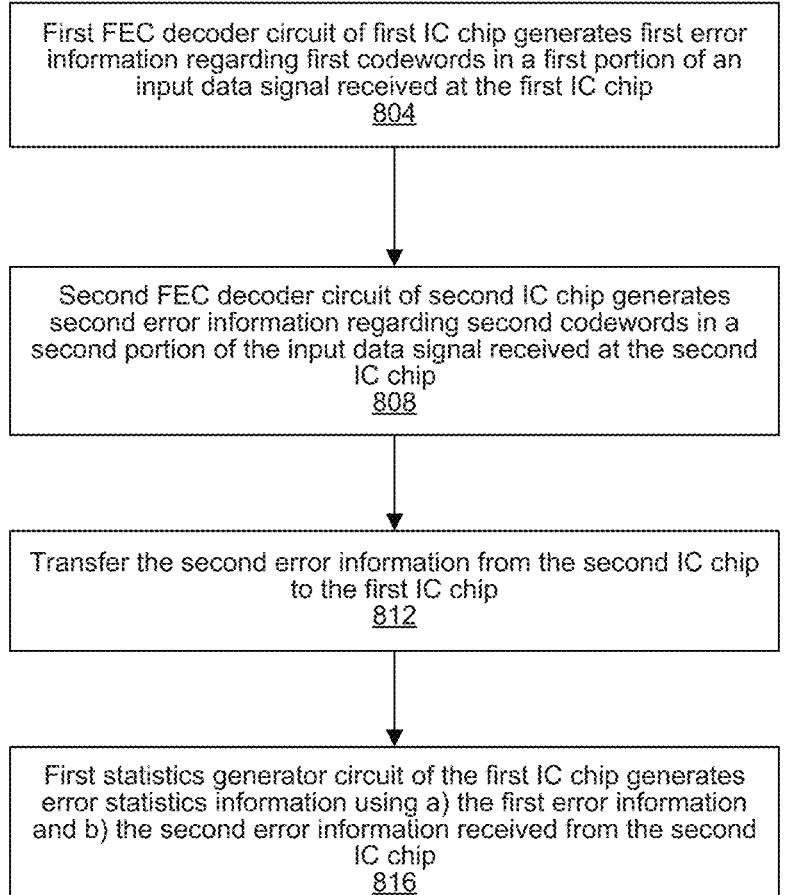

800

First FEC decoder circuit of first IC chip generates first error information regarding first codewords in a first portion of an input data signal received at the first IC chip
804

Second FEC decoder circuit of second IC chip generates second error information regarding second codewords in a second portion of the input data signal received at the second IC chip
808

Transfer the second error information from the second IC chip to the first IC chip
812

First statistics generator circuit of the first IC chip generates error statistics information using a) the first error information and b) the second error information received from the second IC chip
816

MONITORING FEC INFORMATION IN MULTI-CHIP ENVIRONMENT

CROSS REFERENCES TO RELATED APPLICATIONS

This application claims the benefit of U.S. Provisional Patent Application No. 63/548,540, entitled "Chip to Chip FEC Monitor," filed on Nov. 14, 2023, the disclosure of which is hereby expressly incorporated herein by reference in its entirety.

FIELD OF TECHNOLOGY

The present disclosure relates generally to forward error correction (FEC) for high-speed communication links, and more particularly to monitoring FEC statistics in a multi-chip device.

BACKGROUND

The approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

During this time of growth of Internet technologies and usage, demand for high speed data transmission has increased rapidly. Technologies to support such sustained usage levels will continue to proliferate and evolve. For example, the Institute of Electrical and Electronics Engineers (IEEE) recently published a standard for 800 gigabits per second (800 G) Ethernet, and the IEEE is currently developing a standard for 1.6 terabits per second (1.6 T) Ethernet.

Optical transmission of data can support vast amounts of data per channel often limited more by the rate at which electronics can encode a signal onto the optical channel rather than the bandwidth of the channel itself. High-speed communication via electrical media is also used instead of, or in conjunction with, optical communications in some implementations, especially over short distances. For example, a network device typically communicates with an optical module or an intermediate communication device (e.g., a re-timer, a gearbox, etc.) via a high-speed electrical connection. As another example, an intermediate communication device (e.g., a re-timer, a gearbox, etc., between a network device and an optical module) typically communicates with the optical module via a high-speed electrical connection.

In communication systems that utilize both a short distance intermediate communication link (e.g., between a network device and an optical module) and a long distance communication link (e.g., over an optical cable), it is sometimes useful to monitor for errors occurring in the short distance communication link to help with troubleshooting link performance issues by helping to pinpoint where errors are occurring, i.e., across the short distance intermediate link versus across the long distance link.

SUMMARY

In an embodiment, a communication device comprises: a first integrated circuit (IC) chip including: i) a first communication interface configured to receive a first portion of an input data signal, ii) a first forward error correction (FEC) decoder circuit configured to generate first error information regarding the first codeword symbols in the first portion of the input data signal, iii) a second communication interface, and iv) a first statistics generator circuit configured to generate error statistics information using a) the first error information and b) second error information received via the second communication interface; and a second IC chip including: i) a third communication interface configured to receive a second portion of the input data signal, ii) a second FEC decoder circuit configured to generate the second error information, the second error information regarding second codeword symbols in the second portion of the input data signal, and iii) a fourth communication interface communicatively coupled to the second communication interface of the first IC chip, the fourth communication interface configured to send the second error information to the second communication interface.

In another embodiment, a method for generating error statistics in a communication system includes: generating, at a first FEC decoder circuit of a first IC chip, first error information regarding first codeword symbols in a first portion of an input data signal received at the first IC chip; generating, at a second FEC decoder circuit of a second IC chip, second error information regarding second codeword symbols in a second portion of the input data signal received at the second IC chip; transferring the second error information from the second IC chip to the first IC chip; and generating, at a first statistics generator circuit of the first IC chip, error statistics information using a) the first error information and b) the second error information received from the second IC chip.

In yet another embodiment, an optical module for optical communication comprises: an optical transmitter configured to receive electrical transmit signals and to generate one or more optical transmit signals based on the electrical transmit signals; a first IC chip coupled to the optical transmitter, the first IC chip configured to generate a first subset of the electrical transmit signals, the first IC chip including: i) a first communication interface configured to receive a first portion of an input data signal, ii) a first FEC decoder circuit configured to generate first error information regarding the first codeword symbols in the first portion of the input data signal, iii) a second communication interface, and iv) a first statistics generator circuit configured to generate error statistics information using a) the first error information and b) second error information received via the second communication interface; and a second IC chip coupled to the optical transmitter, the second IC chip configured to generate a second subset of the electrical transmit signals, the second IC chip including: i) a third communication interface configured to receive a second portion of the input data signal, ii) a second FEC decoder circuit configured to generate the second error information, the second error information regarding the second codeword symbols in the second portion of the input data signal, and iii) a fourth communication interface communicatively coupled to the second communication interface of the first IC chip, the fourth communication interface configured to send the second error information to the second communication interface.

BRIEF DESCRIPTION OF THE DRAWINGS

FIG. 8 is a flow diagram of an example method for generating error statistics in a communication system such as the communication system of FIG. 1, according to an embodiment.

DETAILED DESCRIPTION

As data rates continue to increase, it is sometimes desirable to process a data signal using multiple integrated circuit (IC) chips operating in parallel, e.g., due to cost or other reasons.

In some implementations, the data signal processed by the multiple IC chips includes forward error correction (FEC) codewords (CWs) of multiple data streams that are interleaved across multiple lanes such that more than one IC chip processes CWs from a single stream. As a result, compiling error information (e.g., statistics) for the single stream of CWs is complicated because errors in the single stream of CWs are detected across multiple IC chips. Therefore, one option is to forego compiling such error statistics. Such error statistics, however, are often useful for troubleshooting link performance issues as described above.

In embodiments described below, multiple IC chips (including at least a first IC chip and a second IC chip) operating in parallel process a data signal that includes FEC CWs of multiple data streams that are interleaved across multiple lanes. Each of the first and second IC chips includes respective FEC decoding circuitry that are configured to generate respective error information regarding respective CW data processed by the respective FEC decoding circuitry. First FEC decoding circuitry of the first IC chip is configured to send error information regarding CW data processed by the first FEC decoding circuitry to second FEC decoding circuitry of the second IC chip to facilitate the second FEC decoding circuitry generating error statistics for a data stream being processed by the multiple IC chips.

Figure 1:
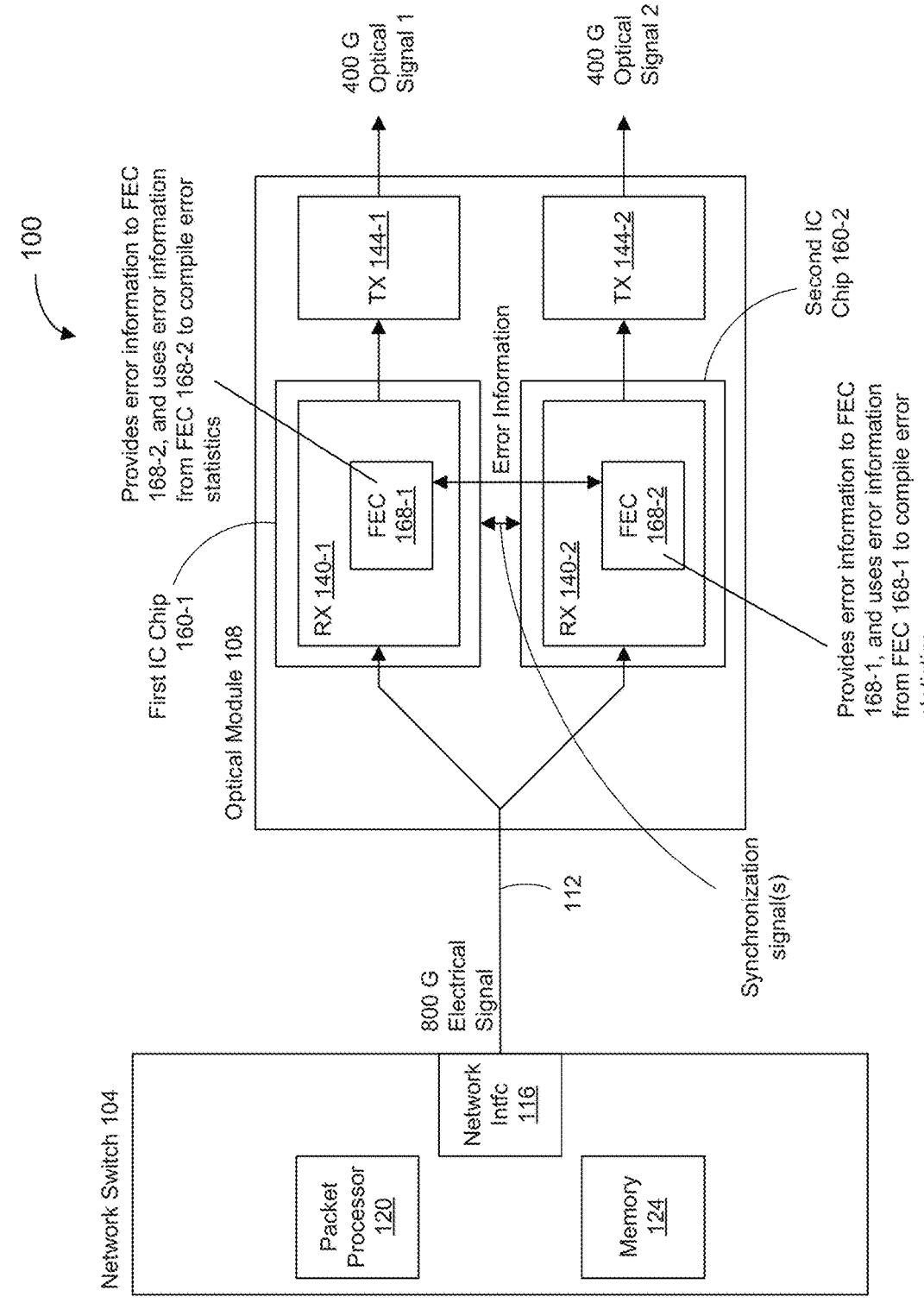
FIG. 1 is a simplified block diagram of an example communication system in which multiple integrated circuit (IC) chips process a communication signal according to an error correction code and in which error statistics are generated, according to an embodiment.

FIG. 1 is a simplified block diagram of an example communication system 100 for transmitting optical communication signals, according to an embodiment. The communication system 100 includes a network switch 104 communicatively coupled to an optical module 108 via a communication link 112.

The network switch 104 includes a plurality of network interfaces 116 (only one shown). The network switch 104 also includes a packet processor 120 configured to analyze at least packet header data of packets received via the network interfaces 116 to determine network interfaces 116 via which the packets are to be forwarded, and a memory 124 configured to store packet data while header data of the packets are processed by the packet processor 120.

FIG. 1 illustrates one network interface 116 communicatively coupled to the optical module 108. Other network interfaces 116 (not shown) are communicatively coupled to other optical modules (not shown) having a structure the same as or similar to the optical module 108, other conventional optical modules (not shown) having a suitable structure different than the optical module 108, and/or electrical ports (not shown), etc., according to various embodiments.

The communication link 112 is an electrical communication link that operates at a suitable data rate such as 800 gigabits per second (800 G), 1.6 terabits per second (1.6 T), 3.2 T, etc., or another suitable data rate. In an embodiment, the communication link 112 operates according to the 800 G communication protocol. In other embodiments, the communication link 112 operates according to another suitable protocol.

The communication link 112 comprises a plurality of lanes, in some embodiments. For instance, in an embodiment in which the communication link 112 operates according to an 800 G communication protocol, the communication link 112 comprises 16 lanes.

The network interface 116 is configured to transmit FEC encoded codewords (CWs) via the communication link 112. In some embodiments in which the communication link 112 comprises a plurality of lanes, the network interface 116 is configured to interleave multiple streams of CWs across the plurality of lanes.

In some embodiments in which the communication link 112 comprises a plurality of lanes, the network interface 116 periodically inserts one or more alignment markers (AMs) between CWs on the communication link 112, and the optical module 108 uses the AMs to correct for skew between lanes.

The optical module 108 comprises a plurality of receivers 140 and a plurality of transmitters 144. Each receiver 140 is communicatively coupled to a corresponding transmitter 144.

In an embodiment in which the communication link 112 comprises a plurality of lanes, each receiver 140 is communicatively coupled to a respective subset of the lanes. In another embodiment, the optical module 108 comprises a distribution circuit (not shown) that is configured to distribute data received via the communication link 112 to the plurality of receivers 140.

In the example of FIG. 1, the optical module 108 comprises two receivers 140 and two transmitters 144. In other embodiments, the optical module 108 comprises i) more than two receivers 140 and/or ii) a) one transmitter 144 or b) more than two transmitters 144. Each receiver 140 is configured to process CW data received via the communication link 112, and output CW data to a corresponding transmitter 144. In an embodiment, each receiver 140 includes a communication interface circuit (not shown) configured to output a transmit signal corresponding to the CW data to the corresponding transmitter 144. In an embodiment, each receiver 140 is also configured to compile error statistics regarding errors detected in CWs received via the communication link 112.

Each transmitter 144 is configured to i) receive an electrical transmit signal from the corresponding receiver 140, ii) convert the electrical transmit signal into one or more optical transmit signals, and iii) output the one or more optical transmit signals to a suitable respective optical media, such as a fiber optic cable.

In other embodiments, the receivers 140 output electrical transmit signals to a single transmitter 144 that is configured to i) receive the electrical transmit signals from the receivers 140, ii) convert the electrical transmit signals into one or more optical transmit signals, and iii) output the one or more optical transmit signals to a suitable optical media, such as a fiber optic cable.

The receiver 140-1 is implemented on a first IC chip 160-1, and the receiver 140-2 is implemented on a second IC chip 160-2 distinct from the first IC chip 160-1. In another embodiment, at least a portion of the transmitter 144-1 is also implemented on the first IC chip 160-1, and at least a portion of the transmitter 144-2 is also implemented on the second IC chip 160-2.

In an embodiment, each IC chip 160 is included within a suitable respective chip package having suitable external interconnect structures for inputting and outputting signals to/from the IC chip 160, such as a ball grid array (BGA), a pin grid array (PGA), etc., and the IC chips 160 are communicatively coupled via such external interconnect structures. In other embodiments, the IC chips 160 are included within a multi-chip module, a system in a package (SiP), etc., and the IC chips 160 are communicatively coupled via suitable interconnect structures such as wires, solder bumps, through-silicon vias (TSVs), Cu—Cu connections, etc.

Each receiver 140 includes a respective FEC decoder circuit 168 that is configured to process CW data received by the respective IC chip 160 via the communication interface 112, and generate error information regarding the CW data received by the respective IC chip 160. Additionally, the FEC decoder circuit 168-2 is configured to send at least at least a portion of the error information generated by the FEC decoder circuit 168-2 to the first IC chip 160-1; and the FEC decoder circuit 168-1 is configured to generate error statistics regarding data received via the communication interface 112 using i) error information generated by the FEC decoder circuit 168-1, and ii) error information generated by the FEC decoder circuit 168-2. In an embodiment, the FEC decoder circuit 168-1 is also configured to send at least at least a portion of the error information generated by the FEC decoder circuit 168-1 to the second IC chip 160-2; and the FEC decoder circuit 168-2 is configured to generate error statistics regarding data received via the communication interface 112 using i) error information generated by the FEC decoder circuit 168-2, and ii) error information generated by the FEC decoder circuit 168-1.

In an embodiment, the FEC decoder circuits 168 do not decode CWs received via the communication interface 112, but merely detect errors in at least some of the CWs and generate statistics regarding the errors detected in the CWs. Such statistics are useful for troubleshooting link performance issues by helping to pinpoint where errors are occurring, i.e., across the communication link 112 versus some other segment of a communication path, such as across one or both optical media, at least in some embodiments. In other embodiments, the FEC decoder circuits 168 are configured to decode at least some CWs received via the communication interface 112, and/or the error statistics are used for other purposes.

In an embodiment, the IC chips 160 are configured to communicate via one or more synchronization signals to synchronize collection of error information and/or generation of error statistics. For example, the IC chips 160 exchange one or more lock signals that indicate when all of the IC chips 160 have achieved lock to AMs received via the communication interface 112, and the IC chips generate error statistics using error information that is generated after all of the IC chips 160 have achieved lock to the AMs, according to an embodiment. As another example, when the IC chips 160 are to generate error statistics for a particular time period and/or group of CWs, the IC chips 160 exchange one or more measurement timing signals that indicate the particular time period and/or the particular group of CWs. For instance, the IC chips 160 exchange one or more measurement timing signals that indicate, for a particular set of error statistics, when measurement of error information is to begin, when measurement of error information is to end, and/or how many CWs are to be used for generating the error statistics, according to various embodiments.

Figure 2:
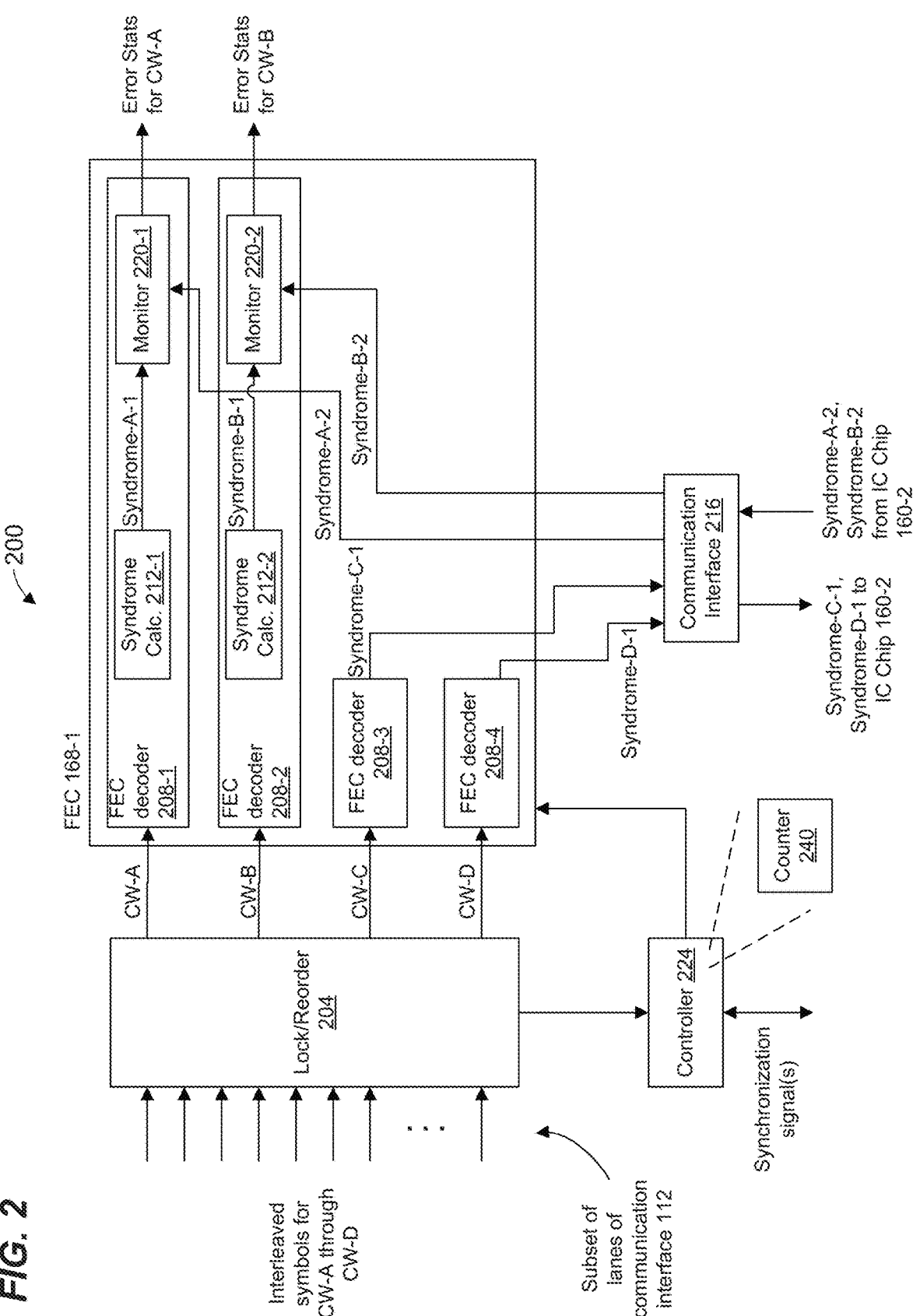
FIG. 2 is a simplified block diagram of an example IC chip for use in the communication system of FIG. 1, according to an embodiment.

FIG. 2 is a simplified block diagram of an example IC chip 200 for use in a communication system that processes signals using multiple IC chips, according to an embodiment. The IC chip 200 is used as the IC chip 160-1 of FIG. 1, in an embodiment, and FIG. 2 is described with reference to FIG. 1 for ease of explanation. In other embodiments, the IC chip 200 is used in a communication system different than the communication system 100 of FIG. 1. In other embodiments, the communication system 100 uses a suitable IC chip different than the IC chip 200.

The IC chip 200 is coupled to a subset of lanes of the communication interface 112, and the IC chip 200 receives, via the subset of lanes, CW data corresponding to four streams of CWs, i.e., CWs-A, CWs-B, CWs-C, and CWs-D. Another IC chip (not shown; e.g., the IC chip 160-2) is coupled to another subset of lanes of the communication interface 112, and the other IC chip (e.g., the IC chip 160-2) receives, via the subset of lanes, other CW data corresponding to the four streams of CWs-A, CWs-B, CWs-C, and CWs-D. The other IC chip (not shown) has a structure similar to the IC chip 200, in an embodiment.

Symbols of the CWs received by the IC chip 200 via the subset of lanes are interleaved across the lanes of communication interface 112 according to a predetermined interleaving pattern that is synchronized with AMs periodically included amongst the CW data received by the IC chip 200 via the subset of lanes. A lock/reorder circuit 204 is configured to achieve lock with respect to the AMs and to, after achieving lock with respect to the AMs, reorder symbols of the CWs to output streams of CW symbols corresponding to the four streams of CWs-A, CWs-B, CWs-C, and CWs-D.

The CW symbols output by the lock/reorder circuit 204 are provided to the FEC decoder circuit 168-1, which includes respective FEC decoder circuitry 208 configured to i) generate error information for the streams of CWs-A, CWs-B, CWs-C, and CWs-D, respectively, according to an FEC decoding algorithm. Each of at least some of the FEC decoder circuitry 208 is configured to generate error statistics regarding a respective stream of CW symbols processed by the FEC decoder circuitry 208.

Each FEC decoder circuitry 208 includes syndrome calculation circuitry 212 that is configured to generate, for CW symbols processed by the FEC decoder 208, corresponding first error information regarding the CW symbols. For example, each syndrome calculation circuitry 212 is configured to generate, for CW symbols processed by the FEC decoder circuitry 208, first error information regarding the CW symbols processed by the FEC decoder circuitry 208. In an embodiment, each syndrome calculation circuitry 212 is configured to output, for CW symbols processed by the FEC decoder 208, first partial syndrome information regarding the CW symbols processed by the FEC decoder circuitry 208.

The IC chip 200 also includes a communication interface 216 that is configured to communicate information to and from the other IC chip, e.g., the IC chip 160-2. The communication interface 216 is coupled to the FEC decoder circuitry 208-3 and the FEC decoder circuitry 208-4, and the communication interface 216 receives first error information (e.g., first syndrome values or other suitable error information) generated by the FEC decoder 208-3 and the FEC decoder 208-4, the first error information regarding symbols of the streams of CWs-C and CWs-D processed by the FEC decoder circuitry 208-3 and the FEC decoder circuitry 208-4. The communication interface 216 is configured to transmit the first error information corresponding to the streams of CWs-C and CWs-D to the other IC chip, e.g., the IC chip 160-2. The communication interface 216 also receives second error information generated by the other IC chip, the second error information corresponding to the symbols of the streams of CWs-A and CWs-B processed by the other IC chip.

At least some of the FEC decoder circuitry 208 also includes monitor circuits 220, e.g., at least the FEC decoder 208-1 and the FEC decoder 208-2 include respective monitor circuits 220. The monitor circuit 220-1 receives i) first error information from the syndrome calculation circuit 212-1 regarding symbols of CWs-A processed by the FEC decoder 208-1, and ii) second error information from the IC chip 160-2 regarding symbols of CWs-A processed by the IC chip 160-2. The monitor circuit 220-1 generates, using the first error information from the syndrome calculation circuitry 212-1 and the second error information from the IC chip 160-2, error statistics regarding symbols of CWs-A processed by both of the IC chip 200 and the IC chip 160-2.

In an embodiment in which the first error information includes first syndrome values for a CW and the second error information includes second syndrome values for the CW, the monitor circuit 220-1 is configured to use the first syndrome values and the second syndrome values to generate a syndrome for the CW, where the syndrome indicates a number of errors detected in the CW. The monitor circuit 220-1 is configured to use the generated syndrome to calculate error statistics, in an embodiment.

The monitor circuit 220-2 receives i) first error information from the syndrome calculation circuit 212-2 regarding symbols of CWs-B processed by the FEC decoder 208-2, and ii) second error information from the IC chip 160-2 regarding symbols of CWs-B processed by the IC chip 160-2. The monitor circuit 220-2 generates, using the first error information from the syndrome calculation circuitry 212-2 and the second error information from the IC chip 160-2, error statistics regarding symbols of CWs-B processed by both of the IC chip 200 and the IC chip 160-2.

In an embodiment in which the first error information includes first syndrome values for a CW and the second error information includes second syndrome values for the CW, the monitor circuit 220-2 is configured to use the first syndrome values and the second syndrome values to generate a syndrome for the CW, where the syndrome indicates a number of errors detected in the CW. The monitor circuit 220-2 is configured to use the generated syndrome to calculate error statistics, in an embodiment.

In some embodiments in which the monitor circuits 220 receive syndrome information, each monitor circuit 220 includes circuitry configured to process the syndrome information to extract error information, and to generate the error statistics using the extracted error information. In some embodiments in which the monitor circuits 220 receive syndrome information, each monitor circuit 220 includes circuitry configured to process the syndrome information to extract error information, and monitor circuit 220 is configured to generate the error statistics using the error information generated by the monitor circuit. In some embodiments in which the IC chip 200 receives syndrome information from the other IC chip (e.g., the IC chip 160-2), the IC chip 200 directs the syndrome information to one or more FEC decoder circuitry 208, which process the syndrome information to extract error information.

In an embodiment, the communication interface 216 is configured to communicate at a data rate that is significantly slower (i.e., at least 1000 times slower) than a data rate at which data are received by the IC chip 200 via the communication interface 112. In some such embodiments, the communication interface 216 is implemented using conventional technology. More generally, the communication interface 216 is implemented to provide communication of error information between the IC chip 200 and the other IC chip (e.g., the IC chip 160-2) at a suitable data rate that permits the monitor circuits 220 to generate the error statistics.

In an embodiment, the communication interface 216 comprises a serial interface. In an embodiment, the communication interface 216 comprises a universal asynchronous receiver/transmitter (UART) interface. In another embodiment, the communication interface 216 comprises a parallel interface.

In some embodiments, the IC chip 200 is configured to generate error statistics corresponding to particular time intervals so that the generated error statistics correspond to sampled statistics, i.e., the error statistics provide respective information regarding performance during the particular time intervals. In other embodiments, the IC chip 200 is configured to generate error statistics continuously, i.e., the error statistics continuously provide information regarding performance over a continuous time period.

The IC chip 200 includes a controller 224 that is configured to communicate with the other IC chip (e.g., the IC chip 160-2) via one or more synchronization signals to synchronize collection of error information and/or generation of error statistics. For example, the controller 224 is coupled to the lock/reorder circuit 204 and is configured to determine when the lock/reorder circuit 204 has achieved lock to AMs received via the communication interface 112. Additionally, the controller 224 is configured to determine when the other IC chip (e.g., the IC chip 160-2) has similarly achieved lock to AMs based on one or more lock signals coupled to the IC chip 160-2. Additionally, the controller 224 is configured to signal to the other IC chip (e.g., the IC chip 160-2) that the IC chip 200 has achieved lock to AMs using the one or more lock signals, according to an embodiment.

In an embodiment, the IC chip 200 includes a first open drain IC chip output circuit coupled to a single lock signal, and IC chip 160-2 similarly includes a second open drain IC chip output circuit coupled to the single lock signal; additionally, the single lock signal is coupled to a pull up (or pull down) resistor that is also coupled to a first logic voltage level. When the IC chip 200 has not achieved lock to an AM, the controller 224 controls the first open drain IC chip output circuit to pull the single lock signal to a second logic voltage value. On the other hand, when the IC chip 200 has achieved lock to an AM, the controller 224 controls the first open drain IC chip output circuit to let the single lock signal float. Similarly, when the IC chip 160-2 has not achieved lock to an AM, the second open drain IC chip output circuit of the IC chip 160-2 pulls the single lock signal to the second logic voltage value; and when the IC chip 160-2 has achieved lock to an AM, the second open drain IC chip output circuit of the IC chip 160-2 lets the single lock signal float.

Thus, when any one of the IC chip 200 and the IC chip 160-2 has not achieved lock, the single lock signal is set to the second logic value; on the other hand, when both of the IC chip 200 and the IC chip 160-2 have achieved lock, the single lock signal is pulled by the pull up (or pull down) resistor to the first logic value.

As another example, when the IC chips 200/160 are to generate error statistics for a particular time period and/or group of CWs, the controller 224 is configured to exchange one or more measurement timing signals with the other IC chip (e.g., the IC chip 160-2), the one or more measurement timing signals indicating when measurement of error information is to begin and/or when measurement of error information is to end, according to an embodiment.

In an embodiment, the IC chip 200 includes a third open drain IC chip output circuit coupled to a single measurement timing signal, and IC chip 160-2 similarly includes a fourth open drain IC chip output circuit coupled to the single measurement timing signal; additionally, the single measurement timing signal is coupled to a pull up (or pull down) resistor that is also coupled to a first logic voltage level. When the IC chip 200 is operating in a leader role and the IC chip 160-2 is operating in a follower role, the fourth open drain IC chip output circuit of the IC chip 160-2 lets the single measurement timing signal float. Additionally, the controller 224 controls the third open drain IC chip output circuit to pull the single measurement timing signal to a second logic voltage value when error information measurement for generation of error statistics is to occur, and controls the first open drain IC chip output circuit to let the single lock signal float when error information measurement for generation of error statistics is not to occur.

Thus, when error information measurement for generation of error statistics is to occur, the single measurement timing signal is set to the second logic value; on the other hand, when error information measurement for generation of error statistics is not to occur, the single measurement timing signal is pulled by the pull up (or pull down) resistor to the first logic value.

The controller 224 is configured to control when the monitor circuits 220 generate control statistics and/or control which error information the monitor circuits 220 use to generate control statistics based on the one or more synchronization signals, according to an embodiment.

In some embodiments, the decoder circuitry 208-3 and/or the decoder circuitry 208-4 have a structure the same as or similar to the FEC decoder circuitry 208-1. In an embodiment, the decoder circuitry 208-3 and/or the decoder circuitry 208-4 omit monitor circuitry 220.

Figure 3:
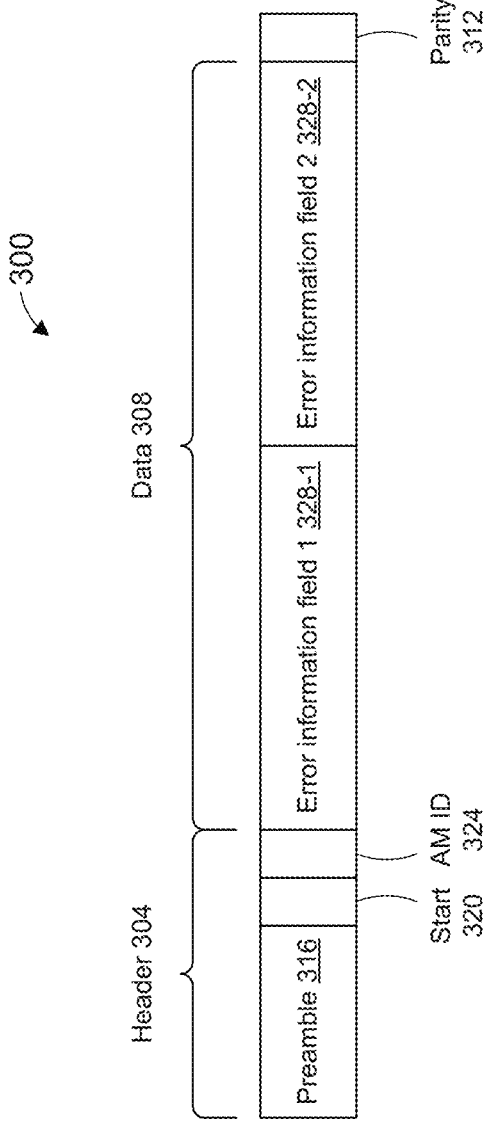
FIG. 3 is a simplified diagram of an example format of a packet for communicating error information between the IC chips of FIG. 1, according to an embodiment.

FIG. 3 is a simplified diagram of an example format of a packet 300 for communicating error information between the IC chips 160 (FIG. 1) and/or to/from the IC chip 200 (FIG. 2), according to an embodiment. FIG. 3 is described with reference to FIGS. 1 and 2 for ease of explanation. In some embodiments, the IC chips 160 (FIG. 1) and/or the IC chip 200 (FIG. 2) communicate error information using another suitable packet format different than the packet format 300 of FIG. 3. In some embodiments, other suitable IC chips different than the IC chips 160 (FIG. 1) and/or the IC chip 200 (FIG. 2) communicate error information using the packet format 300 of FIG. 3.

The packet 300 includes a header 304, a data field 308, and a parity field 312. The header 304 includes a preamble 316 having a suitable predetermined signal and/or bit pattern that facilitates detection of the packet 300. In an embodiment in which the preamble 316 includes all logic ones, the header 304 includes a start field 320 (set to logic zero) that immediately follows the preamble 316 and that indicates a start of a remainder of the packet 300. In some embodiments, the start field 320 is omitted from the packet 300.

The header 304 also includes an AM identifier (ID) field 324 that is toggled in connection with receipt by the IC chip of a set of one or more AMs via the communication interface. For example, the IC chip sets the AM ID field 324 to logic zero for all packets 300 transmitting error information for CWs that are between a first set of one or more AMs and a subsequent second set of one or more AMs; next, the IC chip sets the AM ID field to logic one for all packets 300 transmitting error information for CWs that are between the second set of one or more AMs and a subsequent third set of one or more AMs; next, the IC chip sets the AM ID field to logic zero for all packets 300 transmitting error information for CWs that are between the third set of one or more AMs and a subsequent fourth set of one or more AMs; and so on. In some embodiments, the AM ID field 324 is useful for accounting for skew between CWs received by the different IC chips, as will be described below.

The data portion 308 includes a plurality of fields 328 that include respective error information corresponding to respective CWs, according to an embodiment. In an embodiment, the field 328-1 includes error information for a CW-C and the field 328-2 includes error information for a CW-D. In another embodiment, each packet 300 includes error information for only a single CW.

In an embodiment in which the IC chip 160-2 has a structure similar to the IC chip 200, monitor circuits of the IC chip 160-2 generate i) error statistics regarding CWs-C processed by both of the IC chip 200 and the IC chip 160-2, and ii) error statistics regarding CWs-D processed by both of the IC chip 200 and the IC chip 160-2.

In another embodiment, the IC chip 160-2 also sends to the IC chip 200 error information regarding the streams symbols corresponding to CWs-C and CWs-D, and the IC chip 200 includes additional monitor circuits, similar to the monitor circuits 220, that generate i) error statistics regarding CWs-C processed by both of the IC chip 200 and the IC chip 160-2, and ii) error statistics regarding CWs-D processed by both of the IC chip 200 and the IC chip 160-2. In some such embodiments, the IC chip 200 does not send error information regarding the streams CWs-C and CWs-D to the IC chip 160-2.

As discussed above, sets of one or more AMs are periodically transmitted via the communication interface 112, according to some embodiments. In some embodiments, the collection of error information, the transfer of error information between IC chips 160/200, and/or the generation of error statistics by the IC chip 160/200 is triggered by receipt of a set of one or more AMs via the communication interface 112. Depending on the data rate of the communication interface 112, a rate at which sets of AMs are transmitted via the communication interface 112, the data rate of the communication interface 216, and/or the amount of error information collected, for example, the transfer of error information may or may not be able to be completed between successive sets of AMs.

Figures 4A, 4B:
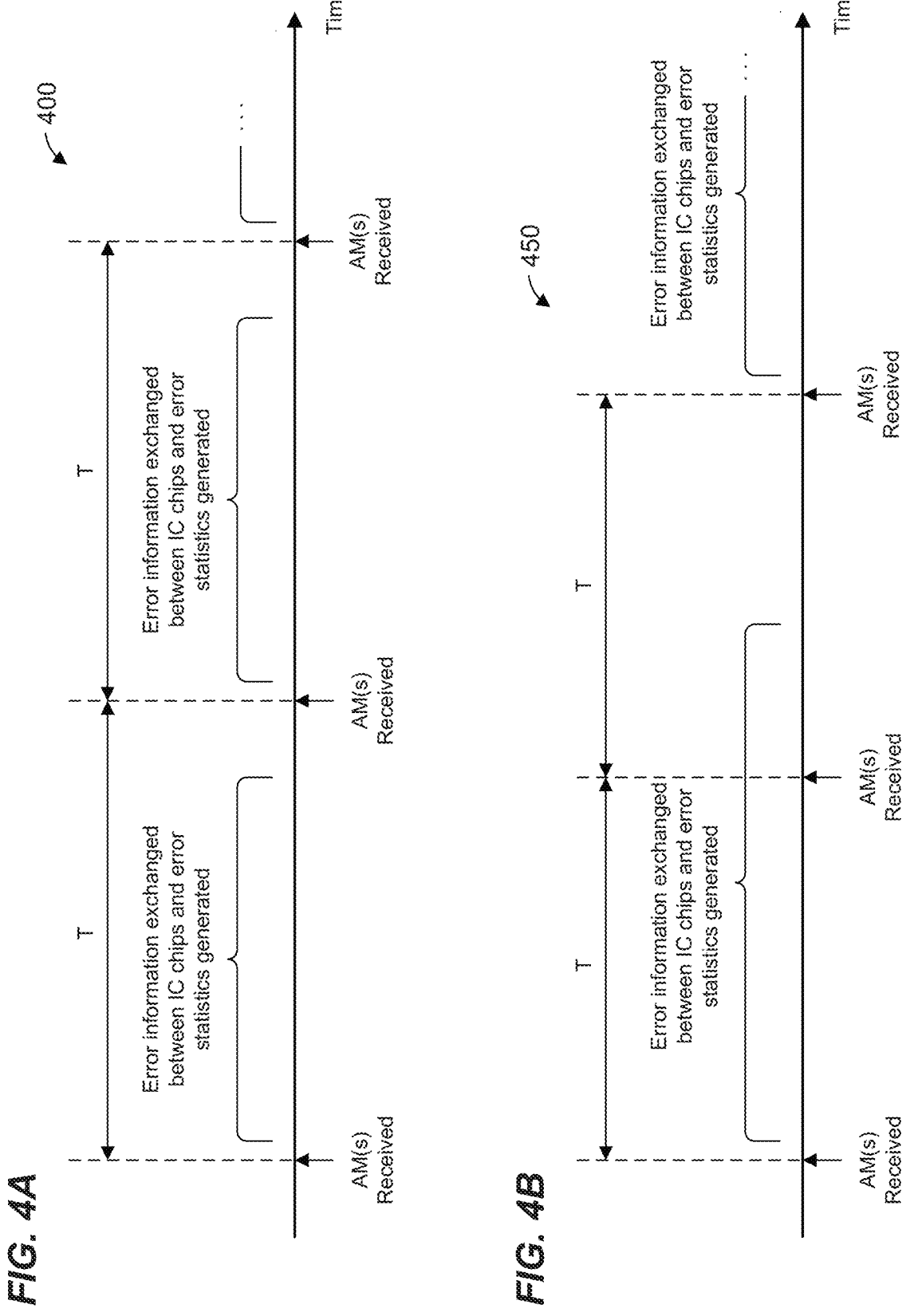
FIGS. 4A-B are timing diagrams illustrating timing of example transfers of error information between IC chips such as the IC chips of FIG. 1, according to various embodiments.

FIGS. 4A-B are timing diagrams 400/450 illustrating timing of example transfers of error information between IC chips, according to various embodiments. FIGS. 4A-B are described with reference to FIGS. 1 and 2 for ease of explanation.

Sets of one or more AMs are periodically received by the IC chip 160/200 via the communication interface 112 according to an AM period of T.

In the example of FIG. 4A, the error information collected by the IC chips 160/200 can be transferred via the communication interface 216 and the error statistics can be generated within a time duration that is less than T, and respective error statistics are generated between successive sets of AMs.

On the other hand, in the example of FIG. 4B, the error information collected by the IC chips 160/200 is transferred via the communication interface 216 and the error statistics is generated within a time duration that is more than T. Therefore, respective error statistics are not generated between successive sets of AMs. Rather, respective error statistics are generated once for every two sets of AMs received via the communication interface 112.

More generally, a frequency at which error information collected by the IC chips 160/200 is transferred via the communication interface 216, and/or a frequency at which error statistics are generated varies according to specific embodiments. In some embodiments, a frequency at which error information collected by the IC chips 160/200 is transferred via the communication interface 216, and/or a frequency at which error statistics are configurable, according to some embodiments.

Referring again to FIG. 1, in embodiments in which the communication interface 112 comprises a plurality of lanes, a skew may exist between a first set of lanes coupled to the first IC chip 160-1 and a second set of lanes coupled to the second IC chip 160-2. The magnitude of the skew may affect a frequency at which the IC chips 160 can generate error statistics, at least in some embodiments.

Figure 5:
FIG. 5 is a timing diagram illustrating a timing of example error statistics generating operations performed by IC chips such as the IC chips of FIG. 1, according to an embodiment.

FIG. 5 is a timing diagram 500 illustrating a timing of example error statistics generating operations performed by IC chips, according to an embodiment. FIG. 5 is described with reference to FIGS. 1 and 2 for ease of explanation.

In the example of FIG. 5, a skew exists such that an IC chip that sends error information ("Sender") is advanced with respect to another IC chip that receives the error information ("Receiver") and uses the received error information to generate error statistics.

The Sender transmits error information to the Receiver (e.g., via the communication interface 216) during time periods 504, and the Receiver generates error statistics during time periods 508. During time periods 512, the Receiver is idle with respect to generating error statistics.

More specifically, the error information transmitted by the Sender during time period 504-1 is used by the Receiver to generate error statistics during time period 508-1. Due to skew between a first set of lanes coupled to the Sender and a second set of lanes coupled to the Receiver, the Sender begins transmitting new error information during the time period 504-2 before the Receiver has completed generating the error statistics during the time period 508-1, which can result in complications with generating the error statistics and/or require more storage at the Receiver for storing error information from the Sender. If, however, the Sender had begun transmitting the new error information during the time period 512-1 during which the Receiver is idle respect to generating error statistics, the receiver could have stored the new error information in a buffer memory (e.g., a first-in-first-out (FIFO) buffer) for later use during the time period 512-2.

The scenario illustrated in FIG. 5 can be detected using the AM ID field 324 of the packet 300 (FIG. 3), in some embodiments. For example, packets used to transmit error information during the time period 504-1 have the AM ID field 324 set to a first logic value, whereas packets used to transmit error information during the time period 504-2 have the AM ID field 324 set to a second logic value. Thus, when the Receiver receives a packet with the AM ID field 324 set to the second logic value during the time period 508 (e.g., when the Receiver is generating error statistics using error information received in packets with the AM ID field 324 set to the first logic value), the Receiver determines that the scenario illustrated in FIG. 5 is occurring.

Thus, in some embodiments, in response to the Receiver determining that the scenario illustrated in FIG. 5 is occurring, the Receiver and the Sender communicate to reduce a frequency at which the Receiver generates error statistics and, optionally, a frequency at which the Sender sends error information to the Receiver. As merely an illustrative example, the Receiver generates error statistics after every two sets of AM(s), as opposed to generating error statistics after every set of AM(s), according to an embodiment.

Figure 6:
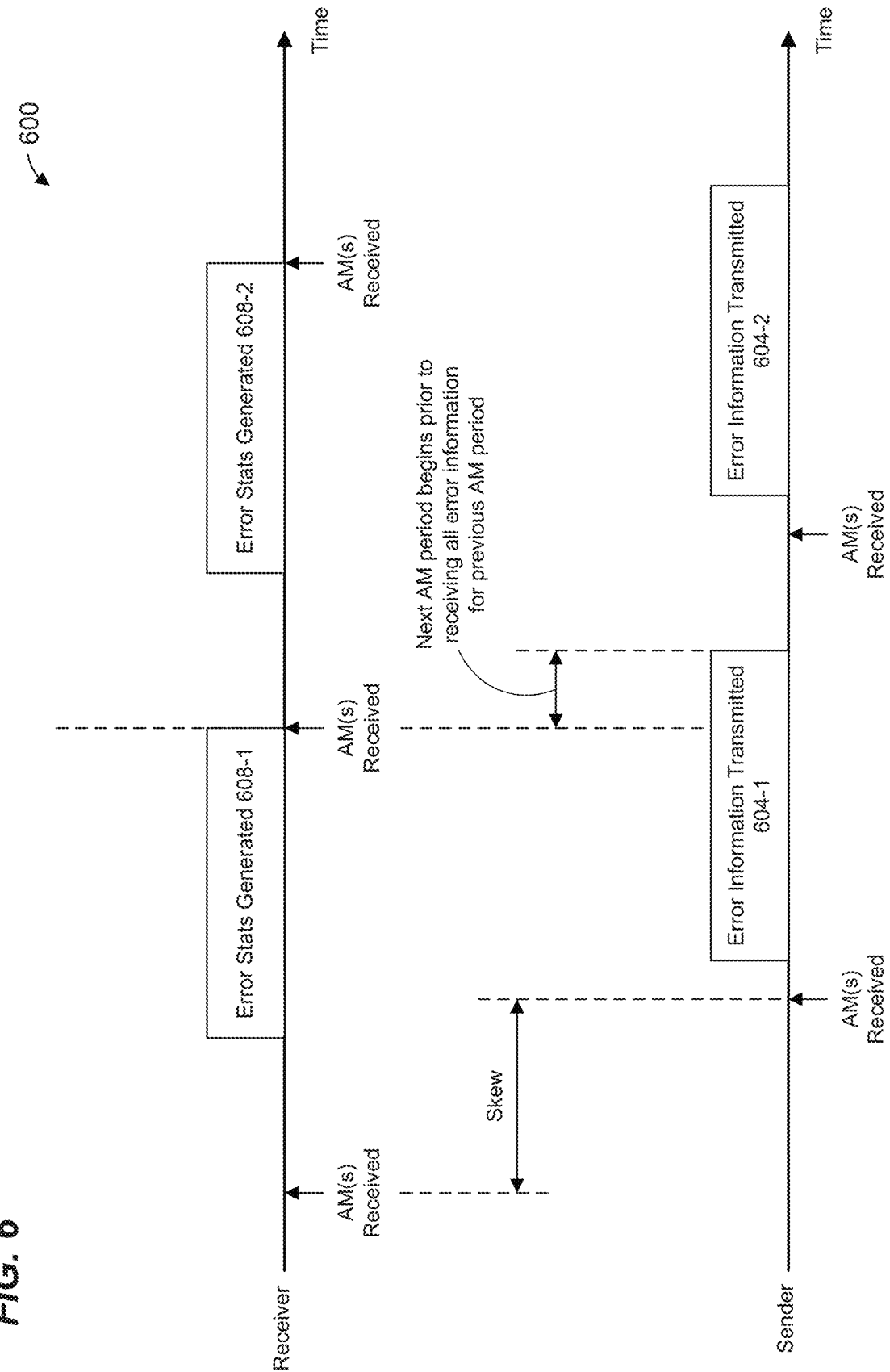
FIG. 6 is a timing diagram illustrating a timing of another example of error statistics generating operations performed by IC chips such as the IC chips of FIG. 1, according to another embodiment.

FIG. 6 is a timing diagram 600 illustrating a timing of another example of error statistics generating operations performed by IC chips, according to another embodiment. FIG. 6 is described with reference to FIGS. 1 and 2 for ease of explanation.

In the example of FIG. 6, a skew exists such that an IC chip that sends error information ("Sender") lags with respect to another IC chip that receives the error information ("Receiver") and uses the received error information to generate error statistics.

The Sender transmits error information to the Receiver (e.g., via the communication interface 216) during time periods 604, and the Receiver generates error statistics during time periods 608. More specifically, the error information transmitted by the Sender during time period 604-1 is used by the Receiver to generate error statistics during time period 608-1. Due to skew between a first set of lanes coupled to the Sender and a second set of lanes coupled to the Receiver, the Sender does not complete transmitting the new error information during the time period 504-2 before the Receiver receives the next set of AM(s), which can result in complications with generating the error statistics and/or require more storage at the Receiver for storing error information from the Sender.

In some embodiments, in response to the Receiver determining that the scenario illustrated in FIG. 6 is occurring, the Receiver and the Sender communicate to reduce a frequency at which the Receiver generates error statistics and, optionally, a frequency at which the Sender sends error information to the Receiver. As merely an illustrative example, the Receiver generates error statistics after every two sets of AM(s), as opposed to generating error statistics after every set of AM(s), according to an embodiment.

Figure 7:
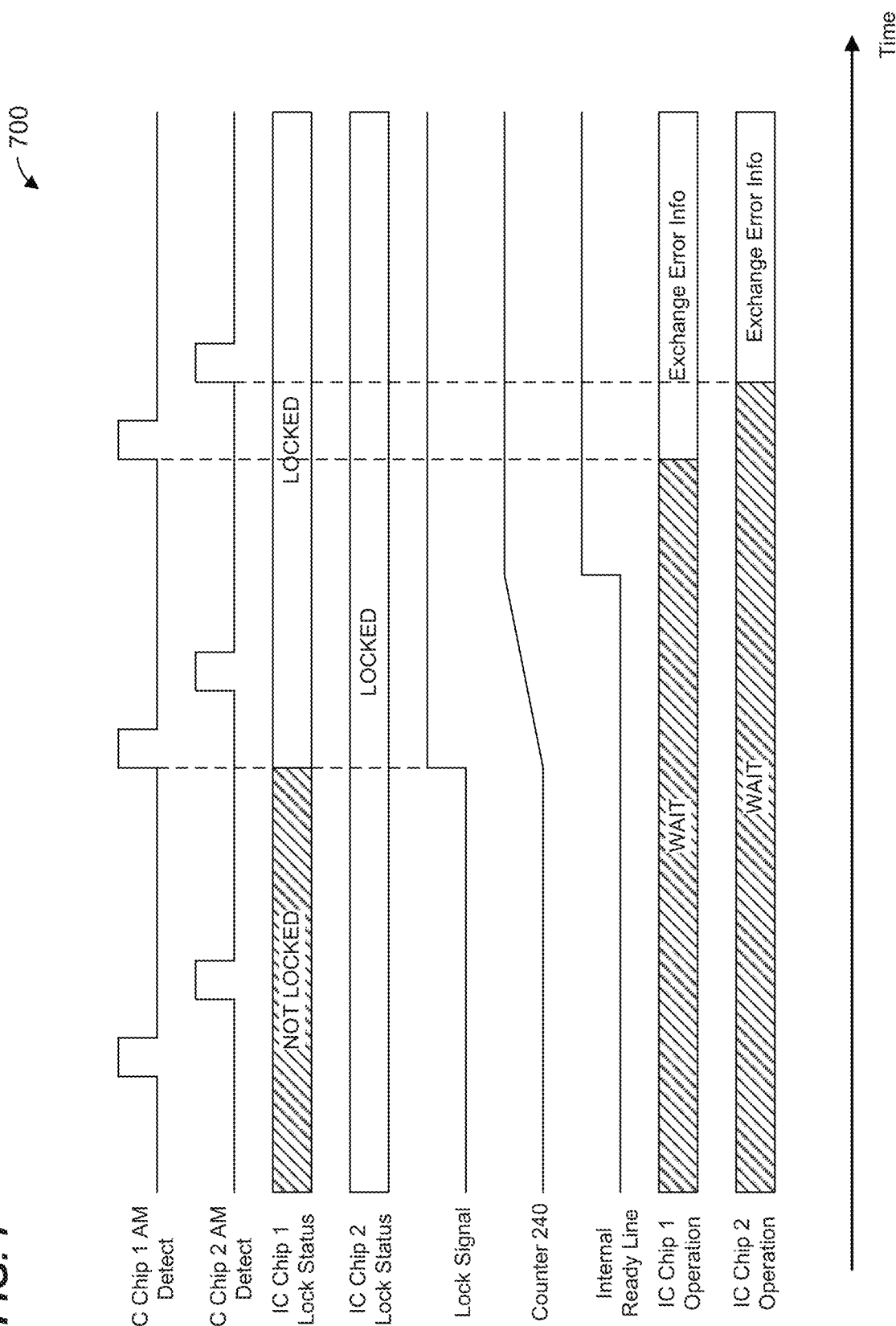
FIG. 7 is a timing diagram that illustrates generation of error statistics by multiple IC chips, such as the IC chips of FIG. 1, with respect to achieving lock to alignment markers (AMs), according to an embodiment.

FIG. 7 is a timing diagram 700 that illustrates generation of error statistics by multiple IC chips with respect to achieving lock to AMs amongst CWs received by the multiple IC chips, according to an embodiment. FIG. 7 is described with reference to FIGS. 1 and 2 for ease of explanation. In some embodiments, the IC chips 160 (FIG. 1) and/or the IC chip 200 (FIG. 2) operate differently than illustrated in FIG. 7. In some embodiments, other suitable IC chips different than the IC chips 160 (FIG. 1) and/or the IC chip 200 (FIG. 2) operate as illustrated in FIG. 7.

In the scenario illustrated in FIG. 7, a first IC chip (IC chip 1) begins in a state in which the IC chip 1 is not locked to AMs, whereas a second IC chip (IC chip 2) has already achieved locked to AMs. Additionally, both of the IC chip 1 and the IC chip 2 begin in a state in which error statistics and/or exchanging error information are not occurring, in an embodiment.

Eventually, the IC chip 1 achieves lock to AMs, and thus the lock signal between the IC chip 1 and the IC chip 2 (as discussed above) transitions from logic low to logic high. In response to the lock signal transitioning from logic low to logic high, both IC chips start respective counters 240, which are included in or coupled to respective controllers 224.

When each counter 240 reaches a threshold, a respective internal ready line of the respective IC chip transitions from a first logic value to a second logic value, where the first logic value corresponds to the IC chip not being ready to generate error statistics and/or not being ready to transmit error information to the other IC chip, and the second logic value corresponds to the IC chip being ready to generate error statistics and to transmit error information to the other IC chip, according to an embodiment. The threshold is selected to be longer than a typical maximum skew that is to be expected between the IC chips, in an embodiment. In an embodiment, the threshold used by the IC chips is configurable.

In response to i) the internal ready line of the IC chip 1 being at the second logic value and ii) detecting a set of AM(s), the IC chip 1 transitions to a state in which i) the IC chip 1 transmits error information (when the error information is available) to the IC chip 2, and ii) the IC chip 1 generates error statistics such as described above. Similarly, in response to i) the internal ready line of the IC chip 2 being at the second logic value and ii) detecting a set of AM(s), the IC chip 2 transitions to a state in which i) the IC chip 2 transmits error information (when the error information is available) to the IC chip 1, and ii) the IC chip 2 generates error statistics such as described above.

FIG. 8 is a flow diagram of an example method 800 for generating error statistics in a communication system, according to an embodiment. The method 800 is implemented by the IC chips 160 of FIG. 1 and/or by the IC chip 200 of FIG. 2, according to an embodiment, and the method 800 is described with reference to FIGS. 1 and 2 merely for illustrative purposes. In other embodiments, the method 800 is implemented by other suitable IC chips different than the IC chips 160 of FIG. 1 and the IC chip 200 of FIG. 2. Additionally, the IC chips 160 of FIG. 1 and/or the IC chip 200 of FIG. 2 do not implement the method 800 and/or implement other suitable methods for generating error statistics different than the example method 800.

At block 804, a first FEC decoder circuit of a first IC chip generates first error information regarding first codeword symbols in a first portion of an input data signal received at the first IC chip. For example, the first IC chip 160-1 generates first error information regarding first codeword symbols in a first portion of an input data signal received at the first IC chip 160-1 via the communication interface 112. As another example, the IC chip 200 generates first error information regarding first codeword symbols in a first portion of an input data signal received at the IC chip 200 via the communication interface 112.

At block 808, a second FEC decoder circuit of a second IC chip generates second error information regarding second codeword symbols in a second portion of the input data signal received at the second IC chip. For example, the second IC chip 160-2 generates second error information regarding second codeword symbols in a second portion of the input data signal received at the second IC chip 160-2 via the communication interface 112.

At block 812, the second error information is transferred from the second IC chip to the first IC chip. For example, the second error information is transferred from the second IC chip 160-2 to the first IC chip 160-1. As another example, the second error information is transferred from the second IC chip 160-2 to the IC chip 200 via the communication interface 216.

At block 816, a first statistics generator circuit of the first IC chip generates error statistics information using a) the first error information and b) the second error information received from the second IC chip. For example, the FEC circuit 168-1 generates error statistics information using a) the first error information generated by the FEC circuit 168-1 and b) the second error information received from the second IC chip 160-2. As another example, the monitor 220-1 generates error statistics information using a) the first error information generated by the FEC circuit 208-1 and b) the second error information received from the second IC chip 160-2.

In another embodiment, the error statistics are first error statistics, and the method 800 further comprises: generating, at the second FEC decoder circuit, third error information regarding third codeword symbols in the second portion of the input data signal; generating, at the first FEC decoder circuit, fourth error information regarding fourth codeword symbols in the first portion of the input data signal; transferring the fourth error information from the first IC chip to the second IC chip; and generating, at a second statistics generator circuit of the second IC chip, second error statistics information using a) the third error information and b) the fourth error information received from the first IC chip.

In another embodiment, generating the error statistics at block 816 comprises: generating the error statistics in response to determining, at the first IC chip, that i) the first IC chip has achieved lock with respect to first alignment markers in the first portion of the input data signal received by the first IC chip, and ii) the second IC chip has achieved lock with respect to second alignment markers in the second portion of the input data signal received by the second IC chip.

In another embodiment, the method 800 further comprises generating, at the second IC chip, an electrical signal that indicates whether the second IC chip achieved lock with respect to the second alignment markers; and determining, at the first IC chip, whether the second IC chip has achieved lock with respect to second alignment markers using the electrical signal.

In another embodiment, generating the electrical signal that indicates whether the second IC chip achieved lock with respect to the second alignment markers comprises: pulling, by the second IC chip, the electrical signal to a first logic voltage level when the second IC chip has not achieved lock with respect to the second alignment markers; letting a voltage of the electrical signal float, by the second IC chip, when the second IC chip has achieved lock with respect to the second alignment markers; pulling, by the first IC chip, the electrical signal to the first logic voltage level when the first IC chip has not achieved lock with respect to the first alignment markers; letting the voltage of the electrical signal float, by the first IC chip, when the first IC chip has achieved lock with respect to the first alignment markers; and pulling, by a resistor coupled between the electrical signal and a second logic voltage level, the electrical signal to the second logic voltage level when the first IC chip and the second IC chip let voltage of the electrical signal float.

In another embodiment, the method 800 further comprises generating, at the first IC chip, an electrical signal that indicates to the second IC chip a time interval for which the second FEC decoder circuit is to provide the second error information.

In another embodiment, the method 800 further comprises generating, at the first IC chip, an electrical signal that indicates to the second IC chip a subset of the second codewords for which the second FEC decoder circuit is to provide the second error information.

In another embodiment, the method 800 further comprises generating, at the first IC chip, an electrical signal that indicates to the second IC chip a quantity of the second codewords for which the second FEC decoder circuit is to provide the second error information.

Referring again to FIGS. 1 and 2, in some embodiments, the IC chips 160/200 are configurable to operate in a system in which CW symbols are interleaved on the communication interface 112 such that the IC chip 160-1 only receives CW symbols corresponding to streams CW-A and CW-B, and the IC chip 160-2 only receives CW symbols corresponding to streams CW-C and CW-D. In such a system, the FEC circuitry 168-1 (e.g., the monitor circuitry 220) is configured to generate error statistics for streams CW-A and CW-B without using error information from the IC chip 160-2, and the FEC circuitry 168-2 is configured to generate error statistics for streams CW-C and CW-D without using error information from the IC chip 160-1, in an embodiment. In some such embodiments, the IC chips 160/200 are configurable so that error information is not exchanged between the IC chips 160/200. In some such embodiments, the FEC circuitry 168-1 (e.g., the monitor circuitry 220) is configurable to generate error statistics for all CWs received by the IC chip 160-1 between AMs in the streams CW-A and CW-B, and the FEC circuitry 168-2 is configurable to generate error statistics for all CWs received by the IC chip 160-2 between AMs in the streams CW-C and CW-D.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such a read-only memory (ROM), a random-access memory (RAM), etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A communication device, comprising:
   a first integrated circuit (IC) chip including: i) a first communication interface configured to receive a first portion of an input data signal, ii) a first forward error correction (FEC) decoder circuit configured to generate first error information regarding the first codeword symbols in the first portion of the input data signal, iii) a second communication interface, and iv) a first statistics generator circuit configured to generate error statistics information using a) the first error information and b) second error information received via the second communication interface; and
   a second IC chip including: i) a third communication interface configured to receive a second portion of the input data signal, ii) a second FEC decoder circuit configured to generate the second error information, the second error information regarding second codeword symbols in the second portion of the input data signal, and iii) a fourth communication interface communicatively coupled to the second communication interface of the first IC chip, the fourth communication interface configured to send the second error information to the second communication interface.

2. The communication device of claim 1, wherein the error statistics are first error statistics, and wherein:
   the first FEC decoder circuit is further configured to generate third error information regarding third codeword symbols in the first portion of the input data signal;
   the second communication interface is configured to send the third error information to the fourth communication interface of the second IC chip;
   the second FEC decoder circuit is further configured to generate fourth error information regarding fourth codeword symbols in the second portion of the input data signal; and
   the second IC chip further comprises a second statistics generator circuit configured to generate second error statistics information using a) the third error information received via the fourth communication interface, and b) the fourth error information.

3. The communication device of claim 1, wherein the first statistics generator of the first IC chip is further configured to:
   generate the error statistics in response to determining that i) the first IC chip has achieved lock with respect to first alignment markers in the first portion of the input data signal received by the first IC chip, and ii) the second IC chip has achieved lock with respect to second alignment markers in the second portion of the input data signal received by the second IC chip.

4. The communication device of claim 3, wherein the second IC chip includes a circuit configured to generate an electrical signal that indicates whether the second IC chip achieved lock with respect to the second alignment markers; and
   wherein the first IC chip is configured to determine whether the second IC chip has achieved lock with respect to second alignment markers using the electrical signal.

5. The communication device of claim 4, wherein the circuit of the second IC chip configured to generate the electrical signal that indicates whether the second IC chip achieved lock with respect to the second alignment markers comprises a first circuit configured to i) pull the electrical signal to a first logic voltage level when the second IC chip has not achieved lock with respect to the second alignment markers, and ii) let a voltage of the electrical signal float when the second IC chip has achieved lock with respect to the second alignment markers;
   the first IC chip includes a first circuit configured to i) pull the electrical signal to the first logic voltage level when the first IC chip has not achieved lock with respect to the first alignment markers, and ii) let the voltage of the electrical signal float when the first IC chip has achieved lock with respect to the first alignment markers; and the communication device further comprises a resistor coupled between the electrical signal and a second logic voltage level, the resistor configured to pull the electrical signal to the second logic voltage level when the first circuit and the second circuit let voltage of the electrical signal float.

6. The communication device of claim 1, wherein the first IC chip includes circuitry configured to generate an electrical signal that indicates to the second IC chip a time interval for which the second FEC decoder circuit is to provide the second error information.

7. The communication device of claim 1, wherein the first IC chip includes circuitry configured to generate an electrical signal that indicates to the second IC chip a subset of the second codewords for which the second FEC decoder circuit is to provide the second error information.

8. The communication device of claim 1, wherein the first IC chip includes circuitry configured to generate an electrical signal that indicates to the second IC chip a quantity of the second codewords for which the second FEC decoder circuit is to provide the second error information.

9. The communication device of claim 1, wherein the first IC chip is separate from the second IC chip.

10. A method for generating error statistics in a communication system, the method comprising:

generating, at a first forward error correction (FEC) decoder circuit of a first integrated circuit (IC) chip, first error information regarding first codeword symbols in a first portion of an input data signal received at the first IC chip;

generating, at a second FEC decoder circuit of a second IC chip, second error information regarding second codeword symbols in a second portion of the input data signal received at the second IC chip;

transferring the second error information from the second IC chip to the first IC chip; and generating, at a first statistics generator circuit of the first IC chip, error statistics information using a) the first error information and b) the second error information received from the second IC chip.

11. The method for generating error statistics of claim 10, wherein the error statistics are first error statistics, and wherein the method further comprises:

generating, at the second FEC decoder circuit, third error information regarding third codeword symbols in the second portion of the input data signal;

generating, at the first FEC decoder circuit, fourth error information regarding fourth codeword symbols in the first portion of the input data signal;

transferring the fourth error information from the first IC chip to the second IC chip; and generating, at a second statistics generator circuit of the second IC chip, second error statistics information using a) the third error information and b) the fourth error information received from the first IC chip.

12. The method for generating error statistics of claim 10, wherein generating the error statistics comprises:

generating the error statistics in response to determining, at the first IC chip, that i) the first IC chip has achieved lock with respect to first alignment markers in the first portion of the input data signal received by the first IC chip, and ii) the second IC chip has achieved lock with respect to second alignment markers in the second portion of the input data signal received by the second IC chip.

13. The method for generating error statistics of claim 12, further comprising:

generating, at the second IC chip, an electrical signal that indicates whether the second IC chip achieved lock with respect to the second alignment markers; and determining, at the first IC chip, whether the second IC chip has achieved lock with respect to second alignment markers using the electrical signal.

14. The method for generating error statistics of claim 13, wherein generating the electrical signal that indicates whether the second IC chip achieved lock with respect to the second alignment markers comprises:

pulling, by the second IC chip, the electrical signal to a first logic voltage level when the second IC chip has not achieved lock with respect to the second alignment markers;

letting a voltage of the electrical signal float, by the second IC chip, when the second IC chip has achieved lock with respect to the second alignment markers;

pulling, by the first IC chip, the electrical signal to the first logic voltage level when the first IC chip has not achieved lock with respect to the first alignment markers;

letting the voltage of the electrical signal float, by the first IC chip, when the first IC chip has achieved lock with respect to the first alignment markers; and pulling, by a resistor coupled between the electrical signal and a second logic voltage level, the electrical signal to the second logic voltage level when the first IC chip and the second IC chip let voltage of the electrical signal float.

15. The method for generating error statistics of claim 10, further comprising:

generating, at the first IC chip, an electrical signal that indicates to the second IC chip a time interval for which the second FEC decoder circuit is to provide the second error information.

16. The method for generating error statistics of claim 10, further comprising:

generating, at the first IC chip, an electrical signal that indicates to the second IC chip a subset of the second codewords for which the second FEC decoder circuit is to provide the second error information.

17. The method for generating error statistics of claim 10, further comprising:

generating, at the first IC chip, an electrical signal that indicates to the second IC chip a quantity of the second codewords for which the second FEC decoder circuit is to provide the second error information.

18. The method for generating error statistics of claim 10, wherein transferring the second error information comprises:

transferring the second error information from the second IC chip to the first IC chip via a communication link that communicatively couples the first IC chip and the second IC chip, which is separate from the first IC chip.

19. An optical module for optical communication, comprising:

an optical transmitter configured to receive electrical transmit signals and to generate one or more optical transmit signals based on the electrical transmit signals;

a first integrated circuit (IC) chip coupled to the optical transmitter, the first IC chip configured to generate a first subset of the electrical transmit signals, the first IC chip including: i) a first communication interface configured to receive a first portion of an input data signal, ii) a first forward error correction (FEC) decoder circuit configured to generate first error information regarding the first codeword symbols in the first portion of the input data signal, iii) a second communication interface, and iv) a first statistics generator circuit configured to generate error statistics information using a) the first error information and b) second error information received via the second communication interface; and a second IC chip coupled to the optical transmitter, the second IC chip configured to generate a second subset of the electrical transmit signals, the second IC chip including: i) a third communication interface configured to receive a second portion of the input data signal, ii) a second FEC decoder circuit configured to generate the second error information, the second error information regarding the second codeword symbols in the second portion of the input data signal, and iii) a fourth communication interface communicatively coupled to the second communication interface of the first IC chip, the fourth communication interface configured to send the second error information to the second communication interface.

20. The optical module of claim 19, wherein the error statistics are first error statistics, and wherein:

the first FEC decoder circuit is further configured to generate third error information regarding third codeword symbols in the first portion of the input data signal;

the second communication interface is configured to send the third error information to the fourth communication interface of the second IC chip;

the second FEC decoder circuit is further configured to generate fourth error information regarding fourth codeword symbols in the second portion of the input data signal; and the second IC chip further comprises a second statistics generator circuit configured to generate second error statistics information using a) the third error information received via the fourth communication interface, and b) the fourth error information.

21. The optical module of claim 19, wherein the first statistics generator of the first IC chip is further configured to:

generate the error statistics in response to determining that i) the first IC chip has achieved lock with respect to first alignment markers in the first portion of the input data signal received by the first IC chip, and ii) the second IC chip has achieved lock with respect to second alignment markers in the second portion of the input data signal received by the second IC chip.

22. The optical module of claim 19, wherein the first IC chip includes circuitry configured to generate an electrical signal that indicates to the second IC chip a time interval for which the second FEC decoder circuit is to provide the second error information.

23. The optical module of claim 19, wherein the first IC chip is separate from the second IC chip.

* * * * *